United States Patent
Garland, Jr. et al.

(10) Patent No.: US 9,611,343 B2
(45) Date of Patent: Apr. 4, 2017

(54) METHODS OF MAKING POLYETHYLENE POLYMER COMPRISING POLAR COMONOMER AND POLYMER COMPOSITIONS

(71) Applicant: ExxonMobil Chemical Patents Inc., Baytown, TX (US)

(72) Inventors: Don A. Garland, Jr., Baton Rouge, LA (US); Michael L. Graham, Baton Rouge, LA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 182 days.

(21) Appl. No.: 14/380,158

(22) PCT Filed: Mar. 1, 2013

(86) PCT No.: PCT/US2013/028550
§ 371 (c)(1),
(2) Date: Aug. 21, 2014

(87) PCT Pub. No.: WO2013/154690
PCT Pub. Date: Oct. 17, 2013

(65) Prior Publication Data
US 2015/0011717 A1   Jan. 8, 2015

Related U.S. Application Data

(60) Provisional application No. 61/623,765, filed on Apr. 13, 2012.

(51) Int. Cl.
C08F 20/40   (2006.01)
C08F 20/10   (2006.01)
(Continued)

(52) U.S. Cl.
CPC .............. *C08F 20/40* (2013.01); *C08F 2/01* (2013.01); *C08F 6/001* (2013.01); *C08F 10/02* (2013.01);
(Continued)

(58) Field of Classification Search
CPC ... C08J 3/124; C08J 11/02; C08F 2/38; C08F 210/02; C08F 218/08; C08F 6/001; C08F 10/02
See application file for complete search history.

(56) References Cited

U.S. PATENT DOCUMENTS

| 2003/0114607 A1 | 6/2003 | Donck |
| 2005/0037219 A1 | 2/2005 | Ohlsson et al. |
| 2010/0087606 A1 | 4/2010 | Karjala et al. |

FOREIGN PATENT DOCUMENTS

| WO | WO2005/014672 | 2/2005 |
| WO | WO 2007/134671 | 11/2007 |

(Continued)

*Primary Examiner* — Fred M Teskin (57) ABSTRACT

A continuous process for producing high pressure polyethylene is described. The process includes contacting first amounts of ethylene, an optional polar comonomer, and a first $C_2$ to $C_{12}$ modifier in the presence of a first amount of initiator in a reaction system under polymerization conditions to form a reaction system effluent comprising a first polyethylene resin having a first concentration of unreacted monomer therein; and directing an ethylene stream and the reaction system effluent to a pressure separation unit operated at separation conditions thereby removing at least a portion of the unreacted monomer from the reaction system effluent.

25 Claims, 1 Drawing Sheet

(51) Int. Cl.
*C08F 2/01* (2006.01)
*C08F 2/38* (2006.01)
*C08F 6/00* (2006.01)
*C08J 3/12* (2006.01)
*C08J 11/02* (2006.01)
*C08F 10/02* (2006.01)
*C08L 23/04* (2006.01)

(52) U.S. Cl.
CPC .............. *C08F 20/10* (2013.01); *C08J 3/124* (2013.01); *C08J 11/02* (2013.01); *B01J 2219/00006* (2013.01)

(56) References Cited

FOREIGN PATENT DOCUMENTS

| | | |
|---|---|---|
| WO | WO 2010/144784 | 12/2010 |
| WO | WO 2011/019563 | 2/2011 |
| WO | WO 2013/052264 | 4/2013 |

METHODS OF MAKING POLYETHYLENE POLYMER COMPRISING POLAR COMONOMER AND POLYMER COMPOSITIONS

PRIORITY CLAIM

This application is a national stage application of Application No. PCT/US2013/028550, filed Mar. 1, 2013, that claims the benefit of Application No. 61/623,765, filed Apr. 13, 2012, the disclosures of which are hereby incorporated by reference in their entireties.

FIELD OF THE INVENTION

Embodiments described herein generally relate to high pressure polyethylene processes and resins made therefrom. More particularly, embodiments described herein relate to ethylene/polar comonomer (e.g., vinyl acetate) resins with improved residual monomer and pelletization performance.

BACKGROUND

Polymers such as low density polyethylene homopolymers and copolymers, particularly those incorporating polar comonomers (e.g., vinyl acetate), become more difficult to pelletize as the melt index increases. Conventionally, pelletizing such polymers has required methods such as reduced production rates, optimizing extruder and pelletizer conditions, and/or cooling the polymer by various methods involving heat transfer to a cooling fluid or vapor. Because of the high viscosity of the polymers, heat transfer coefficients are low and the resulting reduction in temperature is limited and often unsatisfactory. Optimization of extruder and pelletizer conditions has a narrow range of application, especially for softer copolymers.

SUMMARY

In one aspect, some embodiments of the invention provide a continuous process for producing high pressure polyethylene, comprising: 1) contacting a first amount of ethylene, a first amount of a $C_2$ to $C_{12}$ modifier, and optionally a polar monomer in the presence of a first amount of initiator in a reaction system under polymerization conditions to form a reaction system effluent comprising a first polyethylene resin having a first concentration of an unreacted monomer therein; and 2) directing an ethylene stream and the reaction system effluent to a pressure separation unit operated at separation conditions thereby removing at least a portion of the unreacted monomer from the reaction system effluent.

In other embodiments, the invention provides a continuous process for producing a high pressure polyethylene, comprising: 1) contacting a first amount of ethylene, a polar comonomer, and a first amount of a $C_2$ to $C_{12}$ modifier in the presence of a first amount of initiator in a reaction system at polymerization conditions, wherein a reaction system effluent comprises the polyethylene resin having a concentration of unreacted ethylene and polar monomer therein; 2) directing at least a portion of the unreacted ethylene from the reaction system effluent to an ethylene recycle stream; 3) directing the reaction system effluent and the ethylene recycle stream to a low pressure separation unit operated at separation conditions, the ethylene recycle stream being at a temperature sufficient to cause a temperature drop at the pressure separator inlet of from 10.0° C. to 140.0° C., preferably 10.0° C. to 80.0° C., more preferably 30.0° C. to 60.0° C.; 4) continuing the reaction in the reaction system by contacting a second amount of ethylene, additional polar comonomer, and a second amount of a $C_2$ to $C_{12}$ modifier, wherein the first and second amounts of $C_2$ to $C_{12}$ modifiers may be the same or different; and 5) directing a purified polyethylene resin exiting the pressure separation unit to a pelletizing unit; wherein the separation conditions comprise a separator pressure of 0.75 bar (0.075 MPa) to 1.5 bar (0.15 MPa); wherein the pressure separation unit provides the purified polyethylene resin having: a) an unreacted polar monomer concentration 50.0 wt. % to 60.0 wt. % less than the concentration of the unreacted polar monomer in the polyethylene resin of the reaction system effluent, wherein the polar monomer concentration is $1.0 \times 10^3$ ppm to $2.5 \times 10^3$ ppm; and b) an unreacted ethylene concentration $1.5 \times 10^3$ ppm to $0.8 \times 10^3$ ppm at a pressure of 1.2 to 2.4 bar.

In another aspect, embodiments of the invention provide a pelletized polyethylene homopolymer or ethylene/alpha-olefin copolymer produced in a high pressure polymerization process, comprising at least 50.0 wt. % units derived from ethylene; 0.4 wt. % to 4.0 wt. % units derived from a $C_2$ to $C_{12}$ modifier, based on the total weight of the polyethylene homopolymer or ethylene/alpha-olefin copolymer, the polyethylene homopolymer or ethylene/alpha-olefin copolymer having therein an unreacted ethylene concentration of $1.5 \times 10^3$ ppm to $0.8 \times 10^3$ ppm; wherein the polyethylene homopolymer or ethylene/alpha-olefin copolymer has a melt index as measured according to ASTM D1238 (2.16 kg, 190° C.) from $0.40 \times 10^2$ to $35.0 \times 10^2$ dg/min.

BRIEF DESCRIPTION OF THE DRAWING

So that the recited features of the present invention can be understood in detail, a more particular description of the invention, briefly summarized above, may be had by reference to embodiments, some of which are illustrated in the appended drawings. It is to be noted, however, that the appended drawing illustrates only typical embodiments of this invention and therefore are not to be considered limiting of its scope, for the invention may admit to other equally effective embodiments.

The drawing schematically depicts an illustrative high pressure polymerization system suitable for producing a polyethylene polymer comprising polar copolymer according to one or more embodiments described.

DETAILED DESCRIPTION

A high pressure polymerization system as described herein may improve resulting HPPE resin purity and pelletization performance, thereby promoting enhanced processability, among other benefits.

The HPPE resin can have a density of 0.9 g/cm$^3$ to 1.2 g/cm$^3$, or 0.92 g/cm$^3$ to 1.0 g/cm$^3$, or 0.94 g/cm$^3$ to 0.98 g/cm$^3$, or 0.92 g/cm$^3$ to 0.96 g/cm$^3$. The density can also range from a low of about 0.90 g/cm$^3$, 0.92 g/cm$^3$, or 0.94 g/cm$^3$ to a high of about 0.98 g/cm$^3$, 1.0 g/cm$^3$, or 1.2 g/cm$^3$. Such values are measured at room temperature per the ASTM D-1505 test method.

The HPPE resin can have a melt index ("MI") or melt flow rate ("MFR"), as measured according to ASTM D1238, 2.16 kg, 190° C., of less than $5.00 \times 10^2$ or $4.00 \times 10^2$ or $3.00 \times 10^2$ or $2.00 \times 10^2$ or $1.00 \times 10^2$ or $0.50 \times 10^2$ or $0.40 \times 10^2$ g/10 min. The MI can also range from a low of about 0.10, 1.00, 5.00, or 10.00 g/10 min. to a high of about $0.20 \times 10^2$, $0.30 \times 10^2$, $0.40 \times 10^2$, $0.50 \times 10^2$, $1.00 \times 10^2$, $5.00 \times 10^2$, or $35.0 \times 10^2$ g/10 min. The MI can also range from a low of about $0.15 \times 10^2$, $0.25 \times 10^2$, or $0.40 \times 10^2$ g/10 min. to a high of about $0.45 \times 10^2$, $0.50 \times 10^2$, or $0.55 \times 10^2$ g/10 min. The terms "MI" and "MFR" are used interchangeably herein and refer to the measure of the viscosity of polymers that is expressed as the weight of material which flows from a capillary of known dimensions under a 2.16 kg load at 190° C. for a measured period of time, and is measured in g/10 min. according to ASTM D1238.

The melting point of the HPPE resin can be about 40° C. or less, as measured by industry acceptable thermal methods, such as Differential Scanning Calorimetry (DSC). The melting point of the HPPE resin can range from about 40.0° C. to about 90.0° C. The melting point of the HPPE resin can also range from a low of about 40.0° C., 45.0° C., or 50.0° C. to a high of about 55.0° C., 65.0° C., or 75.0° C. The melting point of the HPPE resin can also be 40.0° C. to 80.0° C.; 50.0° C. to 70.0° C.; 55.0° C. to 65.0° C.; or about 60.0° C.

The Vicat softening point of the HPPE resin can be about 20.0° C. to about 80.0° C., as measured by ASTM D1525. The Vicat softening point can also range from a low of about 20° C., 25.0° C., or 30.0° C. to a high of about 35.0° C., 40.0° C., or 50.0° C. The Vicat softening point of the HPPE resin can also be 20.0° C. to 70.0° C.; 30.0° C. to 60.0° C.; 35.0° C. to 45.0° C.; about 35.0° C., or 40.0° C.

The HPPE resin has at least 5.0 wt. % units derived from ethylene and 0.1 wt. % to 10.0 wt. % units derived from one or more modifiers, based on the total weight of the resin. Typically, the amount of ethylene is about 50.0 wt. % to about 99.0 wt. %; about 55.0 wt. % to about 95.0 wt. %; about 60.0 wt. % to about 90.0 wt. %; or about 65.0 wt. % to about 95.0 wt. %. Ethylene copolymers have an amount polymer units derived from ethylene of from about 50.0 wt. %, 51.0 wt. %, or 55.0 wt. % to about 80.0 wt. %, 90.0 wt. %, or 98.0 wt. %.

Suitable modifiers, also called chain transfer agents, can include, but are not limited to, tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-butene-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichlorethane, acetonitrile, N-ethylacetamide, propylene, 1-butene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1, 2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4 dichlorobutene-2, tri-n-butylphosphine, dimethylphosphine, methyl cyanoacetate, carbon tetrachloride, bromotrichloromethane, di-n-butylphosphine, acetaldehyde, proprionaldehyde, and phosphine. Further details and other suitable transfer agents are described in Advances in Polymer Science, Vol. 7, pp. 386-448 (1970).

Preferably, the HPPE contains one or more $C_2$ to $C_{12}$ unsaturated modifiers. The $C_2$ to $C_{12}$ unsaturated modifiers contain at least one unsaturation, but can also contain multiple conjugated or non-conjugated unsaturations. In case of multiple unsaturations, it is preferred that they are non-conjugated. In certain embodiments, the unsaturation of the $C_2$ to $C_{12}$ unsaturated modifier can be di-substituted with one or more alkyl groups in the beta position. Preferred $C_2$ to $C_{12}$ unsaturated modifiers include propylene, isobutylene, or a combination thereof.

The amount of the modifier(s) can range from a low of about 0.1 wt. %, 0.3 wt. %, or 0.8 wt. % to a high of about 3.0 wt. %, 6.0 wt. %, or 10.0 wt. %, based on the total weight of the resin. The amount of the modifier(s) can also range from a low of about 0.2 wt. %, 0.4 wt. %, or 0.8 wt. % to a high of about 1.5 wt. %, 2.5 wt. %, 3.6 wt. %, or 5 wt. %, based on the total weight of the resin. The amount of the modifier can also be 0.1 wt. % to 8 wt. %; 0.2 wt. % to 6 wt. %; 0.3 wt. % to 6 wt. %; 0.3 wt. % to 4 wt. %; 0.4 wt. % to 4.0 wt. %; 0.6 wt. % to 4 wt. %; 0.4 wt. % to 3.5 wt. %; or 0.5 wt. % to 3.8 wt. %, based on the total weight of the resin.

The HPPE resin can optionally include polymer units derived from one or more polar comonomers. The amount of polymer units derived from polar comonomers can be up to 95.0 wt. % and can also range from about 1.0 wt. % to about 5.0 wt. %; about 1.0 wt. % to about 49.0 wt. %; about 5.0 wt. % to about 45.0 wt. %; about 10.0 wt. % to about 50.0 wt. %; about 10.0 wt. % to about 40.0 wt. %; or about 30.0 wt. % to about 45.0 wt. %, based on the total weight of the resin. The amount of polymer units derived from polar comonomers can also range from a low of about 1.0 wt. %, 4.0 wt. %, or 7.0 wt. % to a high of about 30.0 wt. %, 40.0 wt. %, or 45.0 wt. %. Suitable polar comonomers include, but are not limited to: vinyl ethers such as vinyl methyl ether, vinyl n-butyl ether, vinyl phenyl ether, vinyl beta-hydroxy-ethyl ether, and vinyl dimethylamino-ethyl ether; olefins such as propylene, butene-1, cis-butene-2, trans-butene-2, isobutylene, 3,3,-dimethylbutene-1, 4-methylpentene-1, octene-1, and styrene; vinyl type esters such as vinyl acetate, vinyl butyrate, vinyl pivalate, and vinylene carbonate; haloolefins such as vinyl fluoride, vinylidene fluoride, tetrafluoroethylene, vinyl chloride, vinylidene chloride, tetrachloroethylene, and chlorotrifluoroethylene; acrylic-type esters such as methyl acrylate, ethyl acrylate, n-butyl acrylate, t-butyl acrylate, 2-ethylhexyl acrylate, alpha-cyanoisopropyl acrylate, beta-cyanoethyl acrylate, o-(3-phenylpropan-1,3,-dionyl)phenyl acrylate, methyl methacrylate, n-butyl methacrylate, t-butyl methacrylate, cyclohexyl methacrylate, 2-ethylhexyl methacrylate, methyl methacrylate, glycidyl methacrylate, beta-hydroxethyl methacrylate, beta-hydroxpropyl methacrylate, 3-hydroxy-4-carbomethoxy-phenyl methacrylate, N,N-dimethylaminoethyl methacrylate, t-butylaminoethyl methacrylate, 2-(1-aziridinyl)ethyl methacrylate, diethyl fumarate, diethyl maleate, and methyl crotonate; other acrylic-type derivatives such as acrylic acid, methacrylic acid, crotonic acid, maleic acid, methyl hydroxy, maleate, itaconic acid, acrylonitrile, fumaronitrile, N,N-dimethylacrylamide, N-isopropylacrylamide, N-t-butylacrylamide, N-phenylacrylamide, diacetone acrylamide, methacrylamide, N-phenylmethacrylamide, N-ethylmaleimide, and maleic anhydride; and other compounds such as allyl alcohol, vinyltrimethylsilane, vinyltriethoxysilane, N-vinylcarbazole, N-vinyl-N-methylacetamide, vinyldibutylphosphine oxide, vinyldiphenylphosphine oxide, bis-(2-chloroethyl) vinylphosphonate, and vinyl methyl sulfide.

Preferably, the polar comonomer is vinyl acetate (VA). The resulting ethylene vinyl acetate (EVA) resin can have about 5.0 wt. % to about 95.0 wt. %, typically about 20.0 wt. % to about 80.0 wt. %, polymer units derived from vinyl acetate, based on the amounts of polymer units derived from ethylene and vinyl acetate. The amount of polymer units derived from vinyl acetate range from a low of about 20.0 wt. %, 25.0 wt. %, 30.0 wt. %, 35.0 wt. %, or 40.0 wt. % to a high of about 45.0 wt. %, 50.0 wt. %, 55.0 wt. %, 60.0 wt. %, or 80.0 wt. %, based on the total weight of the resin. In certain embodiments, the EVA resin can further include polymer units derived from one or more comonomer units selected from propylene, butene, 1-hexene, 1-octene, and/or one or more dienes. Suitable dienes include, for example, 1,4-hexadiene, 1,6-octadiene, 5-methyl-1,4-hexadiene, 3,7-dimethyl-1,6-octadiene, dicyclopentadiene (DCPD), ethylidene norbornene (ENB), norbornadiene, 5-vinyl-2-norbornene (VNB), and combinations thereof.

The HPPE resin can also contain one or more antioxidants. Phenolic antioxidants are preferred, such as butylated hydroxytoluene (BHT) or other derivatives containing butylated hydroxytoluene units such as Irganox 1076 or Irganox 1010 and alike. The antioxidant can be present in an amount less than 0.05 wt. %, based on the total weight of the resin. When present, for example, the amount of the one or more antioxidants can range from a low of about 0.001 wt. %, 0.005 wt. %, 0.01 wt. %, or 0.015 wt. % to a high of about 0.02 wt. %, 0.03 wt. %, 0.04 wt. %, or 0.05 wt. %.

The HPPE resin can further contain one or more additives. Suitable additives can include, but are not limited to: stabilization agents such as antioxidants or other heat or light stabilizers; anti-static agents; crosslink agents or co-agents; crosslink promotors; release agents; adhesion promotors; plasticizers; or any other additive and derivatives known in the art. Suitable additives can further include one or more anti-agglomeration agents, such as oleamide, stearamide, erucamide or other derivatives with the same activity as known to the person skilled in the art. Preferably, the HPPE resin contains less than 0.15 wt. % of such additives, based on the total weight of the resin. When present, the amount of the additives can also range from a low of about 0.01 wt. %, 0.02 wt. %, 0.03 wt. %, or 0.05 wt. % to a high of about 0.06 wt. %, 0.08 wt. %, 0.11 wt. %, or 0.15 wt. %.

The reactor mixture to produce the HPPE resin can further contain one or more initiators. Suitable initiators can include, but are not limited to, oxygen, peroxide compounds such as hydrogen peroxide, decanoyl peroxide, t-butyl peroxy neodecanoate, t-butyl peroxypivalate, 3,5,5-trimethyl hexanoyl peroxide, diethyl peroxide, t-butyl peroxy-2-ethyl hexanoate, t-butyl peroxy isobutyrate, benzoyl peroxide, t-butyl peroxy acetate, t-butyl peroxy benzoate, di-t-butyl peroxide, di (2-ethyl, hexyl) peroxydicarbonate, and 1,1,3,3-tetramethyl butyl hydroperoxide; alkali metal persulfates, perborates and percarbonates; and azo compounds such as azo bis isobutyronitrile. Organic peroxide initiators are preferred. Suitable organic peroxide initiators can include t-butyl peroxy neodecanoate, t-butyl peroxypivalate, t-butyl peroxy-2-ethyl hexanoate, t-butyl peroxy isobutyrate, and di (2-ethyl, hexyl) peroxydicarbonate. Particularly preferred is di (2-ethyl, hexyl) peroxydicarbonate. Preferably, the reaction mixture contains less than 0.25 wt. % initiator, based on the total weight of the reaction mixture. The amount of the initiator(s) can also range from a low of about 0.01 wt. %, 0.025 wt. %, 0.035 wt. %, or 0.05 wt. % to a high of about 0.06 wt. %, 0.08 wt. %, 0.10 wt. %, 0.15 wt. %, 0.2 wt. % or 0.25 wt. %, based on the total weight of the reaction mixture.

One or more diluents/solvents can be added to the initiator. Suitable diluents/solvents can include one or more non-coordinating, inert liquids including, but not limited to, straight and branched-chain hydrocarbons such as propane, isobutane, butane, pentane, isopentane, hexanes, isohexane, heptane, octane, n-octane, dodecane, isododecane, and mixtures thereof; cyclic and alicyclic hydrocarbons such as cyclohexane, cycloheptane, methylcyclohexane, methylcycloheptane, and mixtures thereof such as can be found commercially (Isopars™ from ExxonMobil); perhalogenated hydrocarbons such as perfluorinated $C_4$ to $C_{10}$ alkanes, chlorobenzene, and aromatic and alkylsubstituted aromatic compounds such as benzene, toluene, mesitylene, and xylene. Suitable solvents also include liquid olefins which may act as monomers or comonomers including ethylene, propylene, 1-butene, isobutylene, 1-hexene, 1-pentene, 3-methyl-1-pentene, 4-methyl-1-pentene, 1-octene, and 1-decene. In certain embodiments, the initiator can include butane, n-octane, or a mixture of one or more $C_9$ to $C_{12}$ paraffinic hydrocarbons.

Figure 1:
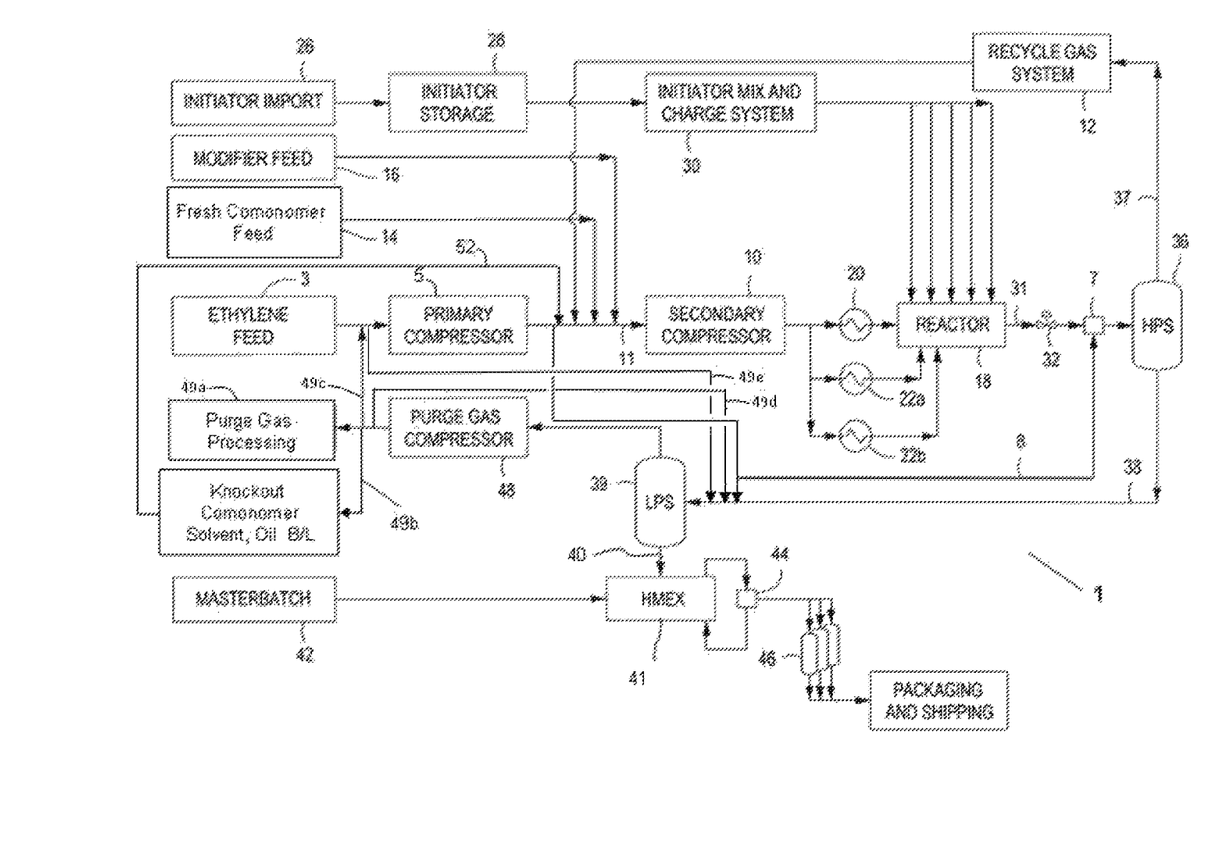

The HPPE resin can be produced in any suitable high pressure polymerization process. The drawing schematically depicts an illustrative high pressure polymerization system 1 suitable for producing a high pressure polyethylene resin, according to one or more embodiments described. The system 1 can include an ethylene feed source 3 that supplies ethylene monomer to a first compressor 5 that pressurizes the ethylene to a pressure of about 150 bar to 200 bar (15 MPa to 20 MPa), or about 200 bar to 300 bar (20 MPa to 30 MPa), or about 300 bar to 350 bar (30 MPa to 35 MPa). Under normal operating conditions, all or substantially all of the ethylene discharged from the first compressor 5 can be directed to a jet pump 7 via line 8. A second compressor 10 located downstream of, and in fluid communication with the first compressor 5, increases the pressure of the reactor feed (line 11), which includes the ethylene feed discharged from the first compressor 5. The second compressor 10 boosts the reactor feed 11 to a pressure of greater than or equal to about 1,500 bar (150 MPa), or greater than or equal to about 2,000 bar (200 MPa), or greater than or equal to about 2,500 bar (250 MPa), or greater than or equal to about 3,000 bar (300 MPa).

As indicated in the drawing, other reaction components can be injected into the suction inlet of the second compressor 10 along with the ethylene monomer, including one or more other comonomers from comonomer feed 14. One or more modifiers from modifier feed 16 can also be injected into the suction inlet of the second compressor 10 along with the ethylene monomer and one or more comonomers.

The compressed reactor feed stream exiting the second compressor 10 can be split into two or more streams. At least one split stream can be heated or cooled in one or more heat exchangers 20 before entering the reactor 18. Other split streams can be cooled in one or more coolers 22a, 22b and introduced to the reactor 18 at different points. The reactor 18 can also include two or more initiator injection points along its length, if a tubular reactor, or at various zones, if an autoclave. The initiator and optionally one or more diluents/solvents can be fed to the reactor 18 from an initiator injection system that can include one or more initiator sources 26, one or more initiator storage vessels 28, and one or more initiator mix and charge systems 30.

From the reactor 18, the exiting mixture of polymer alone or in combination with unreacted monomer (also referred to as "the product stream") via stream 31 can pass through a high pressure let down valve 32. The high pressure let down valve 32 can be controlled to maintain the desired pressure in the reactor 18. From the high pressure let down valve 32, the product stream can flow through the jet pump 7 and then into a separation system that can include one or more high pressure separation ("HPS") vessels 36 and one or more low pressure separation ("LPS") vessels 39.

The high pressure separation vessel 36 can separate the product stream 31 into a stream of unreacted monomer gas 37 and a polymer rich liquid or liquid phase 38. The separated monomer gas can be directed to a recycle gas system 12. The recycle gas system 12 can include one or more waste heat boilers, one or more coolers for cooling the recycle gas, and one or more knock-out pots for dewaxing. The cooled and dewaxed gas exiting the recycle system 12 can flow back to the reactor feed 11 of the second compressor 10.

The polymer rich liquid 38 can be further separated in the one or more low pressure separation vessels 39. The low pressure separation vessel 39 can operate at a pressure of from 0.5 bar to 2.0 bar (0.050 to 0.200 MPa). Molten polymer leaves the low pressure separation vessel 39 via an outlet in the bottom of that vessel (line 40) and passes through a conduit into the intake of one or more hot melt extruders 41. One or more additives to modify the properties of the extruded polymer can be added to the extruder 41 via one or more sources 42 of masterbatch additives. The one or more extruders 41 convert the molten polymer into strings that are chopped, cooled, dried via one or more dryers 44, and then transferred to one or more blenders 46. The polymer resin can then be packaged and shipped to an end user, such as a PV cell converter.

In some embodiments, the reactor feed stream 11 (i.e., ethylene feed) is provided to a pressure separation unit such as the low pressure separator 39 operating at conditions sufficient to remove at least a portion of the unreacted polar monomer from the reaction system effluent. In particular embodiments, such conditions include a separator pressure of less than 3.0 bar (0.30 MPa), preferably less than about 1.5 bar (0.15 MPa), more preferably from 0.75 bar to 1.5 bar (0.075 MPa to 0.15 MPa). The reactor feed stream 11 may be provided before or after the feed stream 11 passes through the primary and/or second compressors, 5 and 10 respectively. Preferably, the ethylene, provided to the low pressure separator provides an amount of ethylene at a temperature sufficient to cause a temperature drop at the pressure separator inlet of from 10.0° C. to 140.0° C., preferably 10.0° C. to 80.0° C., more preferably 30.0° C. to 60.0° C. The ethylene stream is taken from one or more points in the process where the pressure is 30 bar to 80 bar (0.30 MPa to 0.80 MPa) and more often from 35 bar to 50 bar (0.35 MPa to 0.50 MPa). The temperature can range from 5.0° C. to 50.0° C. and more often is near ambient temperature. The amount of ethylene added can range from 10% to 140% of the reactor polymer production rate. The ethylene may be directed to the low pressure separator input via any convenient path, e.g., reactor feed stream 11, the output of the purge gas compressor 49*d*, or the ethylene feed via line 49*e*.

In the low pressure separation vessel 39, at least a portion, if not all, of the remaining monomer is recovered as an off gas that is compressed in one or more purge gas compressors 48. Any portion of the compressed purge gas can be sent to off-site storage sites 49*a* and 49*b*. Likewise, any portion of the compressed purge gas can be recycled to the inlet of the primary compressor 5 via the purge gas recycle (PGR) stream 49*c*. For example, about 10.0 vol %, 20.0 vol %, 30.0 vol %, 40.0 vol %, 50.0 vol %, 60.0 vol %, 70.0 vol %, 80.0 vol %, 90.0 vol %, or 95.0 vol % of the purge gas recycle (PGR) stream 49*c* can be sent to off-site storage sites or further processing equipment 49*a* and 49*b*, and the balance can be recycled to the inlet of the primary compressor 5. In some embodiments as described above, the output of the purge gas compressor is directed through line 49*d* to the inlet of the low pressure separator 39.

In some embodiments, the unreacted vinyl acetate monomer can be separated from the purge gas recycle (PGR) stream 49*c* in the off-site system 49*b*. The separated vinyl acetate monomer can then be recycled to the inlet of the secondary compressor 10 via a recycle vinyl acetate (R-VAM) stream 52.

The reactor 18 can be a tubular or autoclave reactor each having multiple reaction zones. A tubular reactor is a continuous, plug flow loop reactor. An autoclave reactor is a continuous-stirred-tank reactor (CSTR) with an agitator to promote good mixing. The multiple zones of the reactor 18 allow for manipulation of the temperature profile throughout the polymerization process, which allows for tailoring of product properties.

The average reaction temperature can be about 140.0° C. to about 190.0° C. As used herein, the term "average reaction temperature" is calculated using the formula appropriate for the type of reactor used in the polymerization.

The formula calculating the average reaction temperature for a tubular reactor ($T_{avg,TUB}$) is as follows:

$$T_{avg,TUB} = \frac{\sum_{i}^{N} pol_i \times \left(\frac{T_{PKi} + T_{Loi}}{2}\right)}{\sum_{i}^{N} pol_i}$$

where $pol_i$=polymer quantity produced in zone i; $TPKi$=Peak temperature of reaction zone I; and $TLOi$=Light-off temperature of reaction zone i.

The formula for calculating the average reaction temperature of an autoclave reactor ($T_{avg,AC}$) is as follows:

$$T_{avg,AC} = \frac{\sum_{i}^{N} pol_i \times (T_{Zi})}{\sum_{i}^{N} pol_i}$$

where $pol_i$=polymer quantity produced in zone i, and $TZi$=Temperature of reaction zone i.

The polymerization reaction can be conducted by reacting ethylene and the one or more optional monomers, modifiers, initiators, etc., as is known in the art. Typical temperatures include temperatures of about 300° C. or less, 200° C. or less, 180° C. or less, or 170° C. or less at a pressure of $12.00 \times 10^2$ bar (120.0 MPa), at least $18.00 \times 10^2$ bar (180.0 MPa), at least $19.00 \times 10^2$ bar (190.0 MPa), at least $20.00 \times 10^2$ bar (200.0 MPa), at least $25.00 \times 10^2$ bar (250.0 MPa), at least $27.00 \times 10^2$ bar (270.0 MPa), at least $29.00 \times 10^2$ bar (290.0 MPa), or at least $30.00 \times 10^2$ bar (300.0 MPa). Suitable catalysts and catalyst systems are well known in the art.

EXAMPLES

The foregoing discussion can be further described with reference to the following non-limiting examples.

Example 1

In a tubular reactor line operated under conditions sufficient to produce EVA copolymers containing 28 wt. % VA monomer and having a melt index of 400 g/10 min., ethylene is provided at a temperature and pressure sufficient to lower the low pressure separator polymer temperature by 42° C. The resulting increase in extruder and pelletizer process capability allowed the production rate to be increased by 147%.

Example 2

In a tubular reactor line producing EVA copolymers containing 28 wt. % VA monomer and having a melt index of 2500 g/10 min., ethylene is provided at a temperature and pressure sufficient to lower the low pressure separator polymer temperature by 55° C. The resulting increase in extruder and pelletizer process capability allowed the production rate to be increased by 183%.

Example 3

In an autoclave reactor line, ethylene is provided at a temperature and pressure sufficient to lower the low pressure separator polymer temperature by 116° C., allowing the reactor to produce an EnBA copolymer containing 33 wt. % n-butyl acrylate monomer and having a melt index of 2500 g/10 min., at commercially viable rates.

PARTICULAR EMBODIMENTS

Embodiment A provides a continuous process for producing high pressure polyethylene, comprising: 1) contacting a first amount of ethylene, a first amount of a $C_2$ to $C_{12}$ modifier, and optionally a polar monomer in the presence of a first amount of initiator in a reaction system under polymerization conditions to form a reaction system effluent comprising a first polyethylene resin having a first concentration of an unreacted monomer therein; and 2) directing an ethylene stream and the reaction system effluent to a pressure separation unit operated at separation conditions thereby removing at least a portion of the unreacted monomer from the reaction system effluent.

Embodiment B provides a process according to Embodiment A, wherein contacting a first amount of ethylene and a first amount of a $C_2$ to $C_{12}$ modifier includes the optional polar monomer, wherein the unreacted monomer comprises unreacted polar monomer.

Embodiment C provides a process according to Embodiment B, further including providing a second amount of ethylene, polar monomer, and a second amount of a $C_2$ to $C_{12}$ modifier to the reaction system.

Embodiment D provides a process according to any of Embodiments A-C, wherein the first amount of a $C_2$ to $C_{12}$ modifier includes at least one saturated or unsaturated modifier, preferably a linear or branched, substituted or unsubstituted aldehyde or ketone.

Embodiment E provides a process according to any of Embodiments A-D, wherein the pressure separation unit is a low pressure separator, a medium pressure separator, or a flash drum.

Embodiment F provides a process according to any of Embodiments A-E, wherein directing unreacted ethylene from the ethylene recycle stream to the pressure separation unit provides a second amount of ethylene at a temperature sufficient to cause a temperature drop at the pressure separator inlet of from 10.0° C. to 140.0° C., preferably 10.0° C. to 80.0° C., more preferably 30.0° C. to 60.0° C.

Embodiment G provides a process according to any of Embodiments A-F, wherein the separation conditions comprise a separator pressure of less than 3.0 bar, preferably less than 1.5 bar (0.15 MPa), more preferably from 0.75 bar to 1.5 bar (0.075 MPa to 0.15 MPa).

Embodiment H provides a process according to Embodiment G, further comprising purifying and pelletizing the first polyethylene resin.

Embodiment I provides a process according to any of Embodiments A-H, wherein the reaction system is selected from the group consisting of single or multiple reaction zone tubular reactors, autoclave reactors, and combinations thereof.

Embodiment J provides a process according to any of Embodiments A-I, wherein the first amount of the $C_2$ to $C_{12}$ modifier is from 0.4 wt. % to 4.0 wt. %, based on the total of: the first amounts of ethylene, the first amount of $C_2$ to $C_{12}$ modifier, the amount of optional polar monomer, and initiator in the reaction system.

Embodiment K provides a process according to any of Embodiments A-J, wherein the process provides a purified polyethylene resin comprising about 0 wt. % to about 95.0 wt. % polymer units derived from the polar comonomer and 5.0 wt. % to 100.0 wt. % polymer units derived from ethylene, based on the total weight of the high pressure polyethylene.

Embodiment L provides a process according to any of Embodiments A-K, wherein the pressure separation unit provides a purified polyethylene resin having a second unreacted monomer concentration therein, the second unreacted monomer concentration being at least 50.0 wt. % less than, preferably at least 55.0 wt. % less than, at least 60.0 wt. % less than, at least 70.0 wt. % less than, at least 80.0 wt. % less than the first concentration of the unreacted monomer in the first polyethylene resin.

Embodiment M provides a process according to any of Embodiments A-L, wherein the pressure separation unit provides a purified polyethylene resin having therein a second unreacted monomer concentration $\leq 2.5 \times 10^3$ ppm, preferably $\leq 2.0 \times 10^3$ ppm, preferably $\leq 1.5 \times 10^3$ ppm, preferably $\leq 1.0 \times 10^3$ ppm.

Embodiment N provides a process according to any of Embodiments A-M, wherein the pressure separation unit provides a purified polyethylene resin having therein a second unreacted monomer concentration $\leq 1.7 \times 10^3$ ppm, preferably $\leq 1.5 \times 10^3$ ppm, preferably $\leq 1.2 \times 10^3$ ppm, preferably $\leq 1.0 \times 10^3$ ppm.

Embodiment O provides a process according to any of Embodiments A-N, wherein the purified polyethylene resin has a melt index of $0.40 \times 10^2$ g/10 min. to about $35.0 \times 10^2$ g/10 min.

Embodiment P provides a process according to any of Embodiments A-O, wherein the purified polyethylene resin comprises 10.0 wt. % to about 50.0 wt. %, preferably 20.0 wt. % to 40.0 wt. %, more preferably 30.0 wt. % to 35.0 wt. %, polymer units derived from the optional polar monomer.

Embodiment Q provides a process according to any of Embodiments A-P, wherein the purified polyethylene resin comprises 30.0 wt. % to about 35.0 wt. % polymer units derived from the optional polar monomer and has a melt index between about $0.40 \times 10^2$ g/10 min. to about $0.45 \times 10^2$ g/10 min.

Embodiment R provides a continuous process for producing a high pressure polyethylene, comprising: 1) contacting a first amount of ethylene, polar comonomer, and a first $C_2$ to $C_{12}$ modifier in the presence of a first amount of initiator in a reaction system at polymerization conditions, wherein a reaction system effluent comprises a polyethylene resin having a concentration of unreacted ethylene and polar monomer therein; 2) directing at least a portion of the unreacted ethylene from the reaction system effluent to an ethylene recycle stream; 3) directing the reaction system effluent and the ethylene recycle stream to a low pressure separation unit operated at separation conditions, the ethylene recycle stream being at a temperature sufficient to cause a temperature drop at the pressure separator inlet of from 10.0° C. to 140.0° C., preferably 10.0° C. to 80.0° C., more preferably 30.0° C. to 60.0° C.; 3) continuing the reaction in the reaction system by contacting a second amount of ethylene, polar comonomer, and a second $C_2$ to $C_{12}$ modifier, wherein the first and second $C_2$ to $C_{12}$ modifiers may be the same or different; and 4) directing a purified polyethylene resin exiting the pressure separation unit to a pelletizing unit; wherein the separation conditions comprise a separator pressure of 0.75 bar to 1.5 bar (0.075 MPa to 0.15 MPa); wherein the pressure separation unit provides the purified polyethylene resin having: a) an unreacted polar monomer concentration 50.0 wt. % to 60.0 wt. % less than the concentration of the unreacted polar monomer in the polyethylene resin of the reaction system effluent, wherein the polar monomer concentration is $1.0 \times 10^3$ ppm to $2.5 \times 10^3$ ppm at a pressure of 1.2 to 2.4 bar; and b) an unreacted ethylene concentration $1.5 \times 10^3$ ppm to $0.8 \times 10^3$ ppm at a pressure of 1.2 to 2.4 bar.

Embodiment S provides a process according to Embodiment R, wherein the purified polyethylene resin has a melt index of about $0.40 \times 10^2$ to $35.0 \times 10^2$ dg/min.

Embodiment T provides a pelletized polyethylene homopolymer or ethylene/alpha-olefin copolymer produced in a high pressure polymerization process, comprising at least 50.0 wt. % units derived from ethylene; 0.4 wt. % to 4.0 wt. % units derived from a $C_2$ to $C_{12}$ modifier, based on the total weight of the polyethylene homopolymer or ethylene/alpha-olefin copolymer, the polyethylene homopolymer or ethylene/alpha-olefin copolymer having therein an unreacted ethylene concentration of $1.5 \times 10^3$ ppm to $0.8 \times 10^3$ ppm; wherein the polyethylene homopolymer or ethylene/alpha-olefin copolymer has a melt index as measured according to ASTM D1238 (2.16 kg, 190° C.) from $0.40 \times 10^2$ to $35.0 \times 10^2$ dg/min.

Embodiment U provides a pelletized polyethylene homopolymer or ethylene/alpha-olefin copolymer according to Embodiment T having at least 20.0 wt. % units derived from a polar monomer and having therein an unreacted polar monomer concentration of $1.0 \times 10^3$ ppm to $2.5 \times 10^3$ ppm, preferably at a pressure of 1.2 to 2.4 bar.

Embodiment V provides a pelletized polyethylene homopolymer or ethylene/alpha-olefin copolymer according to any of Embodiments T-U, wherein the polar monomer is vinyl acetate or n-butyl acrylate.

Embodiment W provides a pelletized polyethylene homopolymer or ethylene/alpha-olefin copolymer according to any of Embodiments T-V having a melt index, as measured according to ASTM D1238 (2.16 kg, 190° C.), of about $0.40 \times 10^2$ g/10 min. to about $0.50 \times 10^2$ g/10 min.

Embodiment X provides a pelletized polyethylene homopolymer or ethylene/alpha-olefin copolymer according to any of Embodiments T-W, comprising from about 30 wt. % to about 35 wt. % units derived from vinyl acetate and having a melt index between about $0.40 \times 10^2$ g/10 min. to about $0.45 \times 10^2$ g/10 min.

Embodiment Y provides a pelletized polyethylene homopolymer or ethylene/alpha-olefin copolymer according to any of Embodiments T-X, comprising from about 95.0 wt. % to 100.0 wt. % units derived from ethylene and having a melt index between about $0.40 \times 10^2$ g/10 min. to about $8.0 \times 10^2$ g/10 min.

Embodiment Z provides a processes, optionally according to any of Embodiments A-S, for pelletizing a polyethylene homopolymer or ethylene/alpha-olefin copolymer produced in a high pressure polymerization process, the polyethylene homopolymer or ethylene/alpha-olefin copolymer comprising at least 50.0 wt. % units derived from ethylene; 0.4 wt. % to 4.0 wt. % units derived from a $C_2$ to $C_{12}$ modifier, based on the total weight of the polyethylene homopolymer or ethylene/alpha-olefin copolymer, the polyethylene homopolymer or ethylene/alpha-olefin copolymer having therein an unreacted ethylene concentration of $1.5 \times 10^3$ ppm to $0.8 \times 10^3$ ppm; wherein the polyethylene homopolymer or ethylene/alpha-olefin copolymer has a melt index as measured according to ASTM D1238 (2.16 kg, 190° C.) from $0.40 \times 10^2$ to $35.0 \times 10^2$ dg/min.

All documents referred to above are incorporated by reference herein in their entirety unless stated otherwise, including any priority documents and/or testing procedures to the extent they are not inconsistent with this text, provided however that any priority document not named in the initially filed application or filing documents is NOT incorporated by reference herein. As is apparent from the foregoing general description and the specific embodiments of the invention, while forms of the invention have been illustrated and described, various modifications can be made without departing from the spirit and scope of the invention. Accordingly, it is not intended that the invention be limited thereby. In some embodiments of the invention, the polyethylenes described herein are substantially free (i.e., present only at impurity levels or not purposely added to a described composition) of any additive or component not specifically enumerated herein. Advantages described for certain embodiments may or may not be present in other embodiments. Likewise, the term "comprising" is considered synonymous with the term "including" for purposes of Australian law. Whenever a composition, group of elements, or process is described with an open-ended term such as "comprising", it should be understood that embodiments of the invention are envisioned where the composition, group of elements, or process features "consist essentially of," or "consist of" the recited composition, group of elements, or process features.

What is claimed is:

1. A continuous process for producing high pressure polyethylene, comprising:

contacting a first amount of ethylene feed and a first amount of a $C_2$ to $C_{12}$ modifier in the presence of a first amount of initiator in a reaction system under polymerization conditions to form a reaction system effluent comprising a first polyethylene resin having a first concentration of an unreacted monomer therein;

directing a first ethylene stream and the reaction system effluent to one or more high pressure separation vessel(s) operated at separation conditions thereby removing at least a portion of the unreacted monomer from the reaction system effluent to form i) a polymer-rich liquid comprising the first polyethylene resin and at least a portion of unreacted monomer and ii) an ethylene recycle stream comprising unreacted monomer; and directing a second ethylene stream and the polymer-rich liquid to one or more low pressure separation vessel(s)

operated at separation conditions thereby removing at least a portion of the unreacted monomer from the polymer-rich liquid to form a purified polyethylene resin.

2. The process of claim 1, further including providing a first amount of polar monomer, and contacting the first amount of ethylene feed, the first amount of a $C_2$ to $C_{12}$ modifier and the first amount of polar monomer, wherein the unreacted monomer comprises unreacted polar monomer.

3. The process of claim 2, further including providing a second amount of ethylene feed, a second amount of polar monomer, and a second amount of a $C_2$ to $C_{12}$ modifier to the reaction system.

4. The process of claim 1, wherein the first amount of a $C_2$ to $C_{12}$ modifier includes at least one saturated or unsaturated modifier.

5. The process of claim 1, wherein at least a portion of the second ethylene stream comprises unreacted monomer from the ethylene recycle stream and the second ethylene stream provides an amount of ethylene at a temperature sufficient to cause a temperature drop at an inlet of the low pressure separation vessel(s) of from 10.0° C. to 140.0° C.

6. The process of claim 1, wherein the separation conditions comprise a low pressure vessel pressure of less than 3.0 bar.

7. The process of claim 1, wherein the reaction system is selected from the group consisting of single or multiple reaction zone tubular reactors, autoclave reactors, and combinations thereof.

8. The process of claim 2, wherein the first amount of the first $C_2$ to $C_{12}$ modifier is from 0.4 wt. % to 4.0 wt. %, based on the total of: the first amount of ethylene, the first amount of $C_2$ to $C_{12}$ modifier, the first amount of polar monomer, and initiator in the reaction system.

9. The process of claim 2, wherein the process provides a purified polyethylene resin comprising 0 wt. % to 95.0 wt. % polymer units derived from the polar monomer and 5.0 wt. % to 100.0 wt. % polymer units derived from ethylene, based on the total weight of the purified polyethylene resin.

10. The process of claim 1, wherein the purified polyethylene resin has a second unreacted monomer concentration therein, the second unreacted monomer concentration being at least 50.0 wt. % less than the first concentration of the unreacted monomer in the first polyethylene resin.

11. The process of claim 1, wherein the purified polyethylene resin has a second unreacted monomer concentration $\leq 2.5 \times 10^3$ ppm.

12. The process of claim 1, wherein the purified polyethylene resin has a second unreacted monomer concentration $\leq 1.7 \times 10^3$ ppm.

13. The process of claim 1, wherein the purified polyethylene resin has a melt index of $0.40 \times 10^2$ g/10 min. to about $35.0 \times 10^2$ g/10 min.

14. The process of claim 1, wherein directing the second ethylene stream to the low pressure separation vessel(s) provides an amount of ethylene at a temperature sufficient to cause a temperature drop at an inlet of the low pressure separation vessel(s) of from 10.0° C. to 140.0° C.

15. The process of claim 1, further comprising forming a purge gas stream comprising at least a portion of the unreacted monomer removed from the polymer-rich liquid and wherein the second ethylene stream is provided from the ethylene feed, the ethylene recycle stream, and/or the purge gas stream.

16. The process of claim 2, wherein the purified polyethylene resin comprises 10.0 wt. % to about 50.0 wt. % polymer units derived from the polar monomer.

17. The process of claim 2, wherein the purified polyethylene resin comprises 30.0 wt. % to about 35.0 wt. % polymer units derived from the polar monomer and has a melt index between about $0.40 \times 10^2$ g/10 min. to about $0.45 \times 10^2$ g/10 min.

18. A continuous process for producing a high pressure polyethylene, comprising:
contacting a first amount of ethylene, polar comonomer, and a first amount of a $C_2$ to $C_{12}$ modifier in the presence of a first amount of initiator in a reaction system at polymerization conditions, wherein a reaction system effluent comprises a polyethylene resin having a concentration of unreacted ethylene and polar monomer therein;
directing at least a portion of the unreacted ethylene from the reaction system effluent to an ethylene recycle stream;
directing the reaction system effluent and the ethylene recycle stream to a low pressure separation unit operated at separation conditions, the ethylene recycle stream being at a temperature sufficient to cause a temperature drop at the pressure separator inlet of from 10.0° C. to 140.0° C.;
continuing the reaction in the reaction system by contacting a second amount of ethylene, additional polar comonomer, and a second amount of a $C_2$ to $C_{12}$ modifier, wherein the first and second amounts of a $C_2$ to $C_{12}$ modifier may be the same or different; and
directing a purified polyethylene resin exiting the pressure separation unit to a pelletizing unit,
wherein the separation conditions comprise a separator pressure of 0.75 bar to 1.5 bar;
wherein the pressure separation unit provides the purified polyethylene resin having:
(a) an unreacted polar monomer concentration 50.0 wt. % to 60.0 wt. % less than the concentration of the unreacted polar monomer in the polyethylene resin of the reaction system effluent, wherein the polar monomer concentration is $1.0 \times 10^3$ ppm to $2.5 \times 10^3$ ppm at a pressure of 1.2 to 2.4 bar; and
(b) an unreacted ethylene concentration $1.5 \times 10^3$ ppm to $0.8 \times 10^3$ ppm at a pressure of 1.2 to 2.4 bar.

19. The method of claim 18, wherein the purified polyethylene resin has a melt index of about $0.40 \times 10^2$ to $35.0 \times 10^2$ dg/min.

20. A pelletized polyethylene homopolymer or ethylene/alpha-olefin copolymer produced in a high pressure polymerization process, comprising at least 50.0 wt. % units derived from ethylene; 0.4 wt. % to 4.0 wt. % units derived from a $C_2$ to $C_{12}$ modifier, based on the total weight of the polyethylene homopolymer or ethylene/alpha-olefin copolymer, the polyethylene homopolymer or ethylene/alpha-olefin copolymer having therein an unreacted ethylene concentration of $1.5 \times 10^3$ ppm to $0.8 \times 10^3$ ppm; wherein the polyethylene homopolymer or ethylene/alpha-olefin copolymer has a melt index as measured according to ASTM D1238 (2.16 kg, 190° C.) from $0.40 \times 10^2$ to $35.0 \times 10^2$ dg/min.

21. The pelletized polyethylene homopolymer or ethylene/alpha-olefin copolymer of claim 20 having at least 20.0 wt. % units derived from the polar monomer and having therein an unreacted polar monomer concentration of $1.0 \times 10^3$ ppm to $2.5 \times 10^3$ ppm.

22. The pelletized polyethylene homopolymer or ethylene/alpha-olefin copolymer of claim 21, wherein the polar monomer is vinyl acetate or n-butyl acrylate.

23. The pelletized polyethylene homopolymer or ethylene/alpha-olefin copolymer of claim 20 having a melt index, as measured according to ASTM D1238 (2.16 kg, 190° C.), of about $0.40 \times 10^2$ g/10 min. to about $0.50 \times 10^2$ g/10 min.

24. The pelletized polyethylene homopolymer or ethylene/alpha-olefin copolymer of claim 23, comprising from about 30 wt. % to about 35 wt. % units derived from vinyl acetate and having a melt index between about $0.40 \times 10^2$ g/10 min. to about $0.45 \times 10^2$ g/10 min.

25. Pelletizing a polyethylene homopolymer or ethylene/alpha-olefin copolymer produced in a high pressure polymerization process, the polyethylene homopolymer or ethylene/alpha-olefin copolymer comprising at least 50.0 wt. % units derived from ethylene; 0.4 wt. % to 4.0 wt. % units derived from a $C_2$ to $C_{12}$ modifier, based on the total weight of the polyethylene homopolymer or ethylene/alpha-olefin copolymer, the polyethylene homopolymer or ethylene/alpha-olefin copolymer having therein an unreacted ethylene concentration of $1.5 \times 10^3$ ppm to $0.8 \times 10^3$ ppm; wherein the polyethylene homopolymer or ethylene/alpha-olefin copolymer has a melt index as measured according to ASTM D1238 (2.16 kg, 190° C.) from $0.40 \times 10^2$ to $35.0 \times 10^2$ dg/min.

\* \* \* \* \*